(No Model.)

A. EVANS.
WEEDING HOE.

No. 514,419. Patented Feb. 6, 1894.

Witnesses
Jas. H. Blackwood
D. H. Gould

Inventor
Abram Evans
By J. M. Tallmadge, Attorney

THE NATIONAL LITHOGRAPHING COMPANY,
WASHINGTON, D. C.

UNITED STATES PATENT OFFICE.

ABRAM EVANS, OF CORSICA, OHIO.

WEEDING-HOE.

SPECIFICATION forming part of Letters Patent No. 514,419, dated February 6, 1894.

Application filed October 14, 1893. Serial No. 488,136. (No model.)

*To all whom it may concern:*

Be it known that I, ABRAM EVANS, a citizen of the United States, residing at Corsica, in the county of Morrow and State of Ohio, have invented a new and useful Weeding-Hoe, of which the following is a specification.

My invention relates to an improved weeding-hoe, designed for cutting weeds, thinning out plants, &c.; and it has for its object the production of an implement having a series of cutting-edges, the line of cut of each and all of said edges being coincident with the direction in which power is applied to move the hoe horizontally over the ground in either a forward or backward direction, the handle being adjustable as to the angle with the blade.

The invention will first be described in connection with the accompanying drawings, and then pointed out in the claims.

Figure 1:
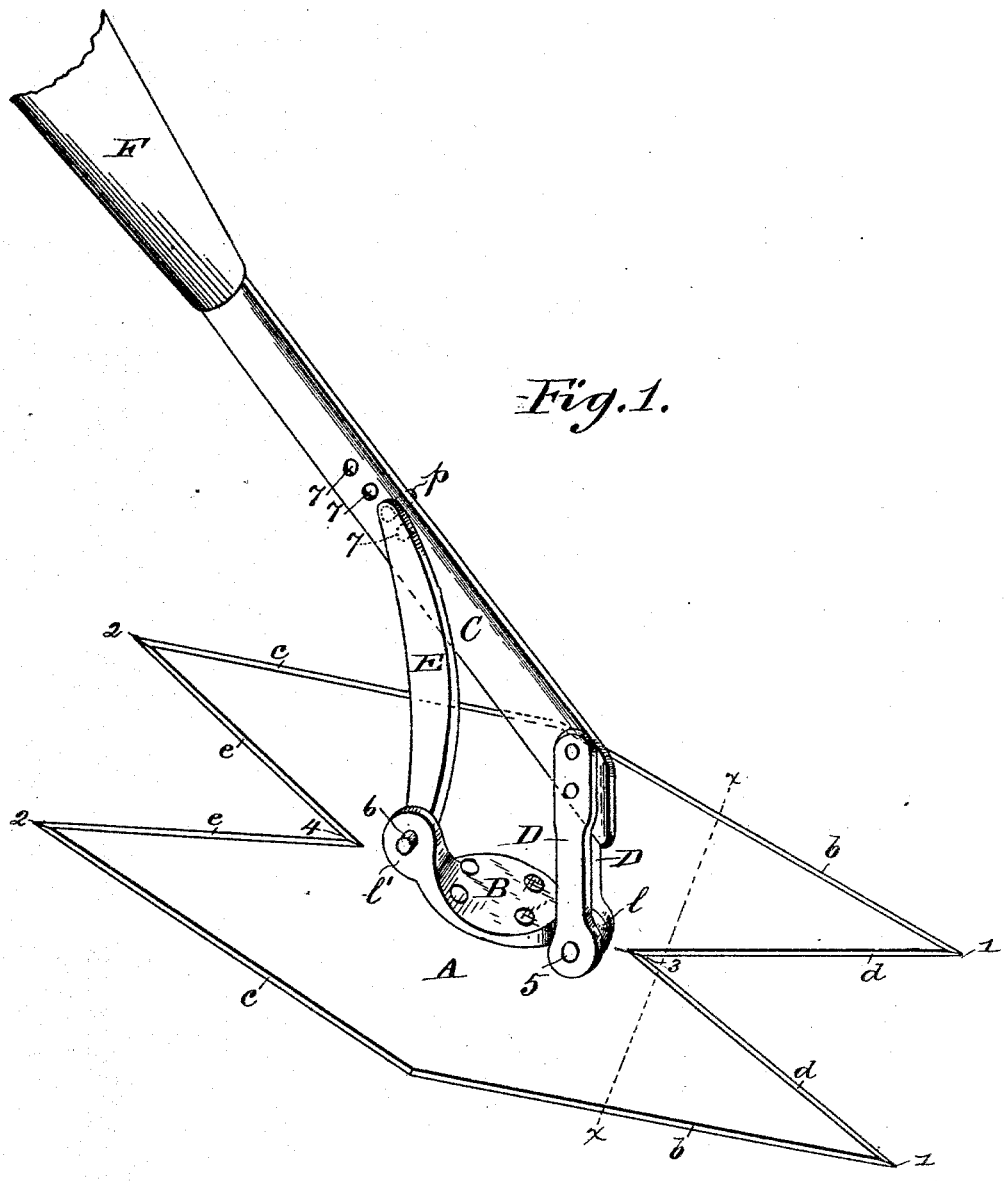
Figure 2:

Figure 1 of the drawings is a perspective view of my improved weeding-hoe. Fig. 2 is a cross-section of the blade, taken on the line $x\,x$, Fig. 1.

Referring to the drawings, A is the cutting-blade, which is of irregular hexagonal shape in general outline. The lateral edges $b\,b$ and $c\,c$ of the blade are beveled from the upper surface outward to the lower surface, thus forming cutting-edges, as shown. The front and rear ends of the blade are bifurcated, the edges $d\,d$ and $e\,e$ of the bifurcations sloping from the points 1 and 2, where they form acute angles with the lateral edges $b\,b$ and $c\,c$, inward to the median line of the blade, and near where the handle is attached, where they join respectively at acute angles as at 3 and 4. The edges of the bifurcations are all cutting-edges, similar to the lateral edges.

B is a metal plate rigidly secured to the upper side of the blade A, in the center thereof, this plate having two perforated lugs $l$ and $l'$.

C is the handle-shank, to the forward end of which, on each side, is rigidly secured an arm D, the lower ends of these arms being pivoted at 5 to the lug $l$ on plate B.

E is a brace for the handle-shank, made of elastic metal. The lower end of this brace is pivoted at 6 to lug $l'$ on plate B, its upper end being provided with a lateral pin $p$, adapted to enter either one of a series of holes 7 in the handle-shank. F is an ordinary wooden handle attached in any suitable manner to the shank.

It will be observed that from the directions in which all the cutting-edges of my hoe run, and also from the acute angles formed at their junctions, whatever resistance hard tough weeds and the like may offer in cutting them will be directed toward the median line of the blade; and as the handle is attached on that line, no lateral pressure on the blade is required. Hence it follows that the implement may be very easily worked, as in simply pushing the blade forward or pulling it backward, a shear cut is given. It will also be observed that by attaching the handle pivotally to the blade, I am enabled not only to adapt the hoe to convenient use by persons of different heights, but also to adapt it for use in situations where the handle, if not adjustable, would be in the way, as working around bushes, shrubbery, &c.

Having thus described my invention, what I claim as new, and desire to secure by Letters Patent, is—

1. In a weeding-hoe, an irregular hexagonal shaped blade having bifurcated ends, the edges of the bifurcations being at acute angles to the lateral edges and meeting at acute angles on the median line of the blade, all of the edges being cutting edges.

2. A weeding-hoe comprising an irregular hexagonal shaped blade having bifurcated ends, the edges of the bifurcations being at acute angles to the lateral edges and meeting at acute angles on the median line of the blade, and a handle secured to the blade on the median line of the latter.

3. A weeding-hoe comprising an irregular hexagonal shaped blade having bifurcated ends, the edges of the bifurcations being at acute angles to the lateral edges and meeting at acute angles on the median line of the blade, and a handle pivotally connected to the blade on the median line of the latter, and a brace pivotally secured at its lower end to the blade, its upper end being adapted to engage with and hold the handle at any desired inclination to the blade.

In testimony that I claim the foregoing as my own I have hereto affixed my signature in presence of two witnesses.

ABRAM EVANS.

Witnesses:
CHRISTIE WILLIAMS,
WM. D. RICHARDSON.